May 1, 1951     W. J. BRYANT ET AL     2,550,908

HIGH-SPEED ROTOR MOUNTING

Filed April 26, 1949

INVENTORS
WILLIAM J. BRYANT
THOR H. LJUNGGREN

ATTYS

Patented May 1, 1951

2,550,908

UNITED STATES PATENT OFFICE 2,550,908

HIGH-SPEED ROTOR MOUNTING

William J. Bryant and Thor H. Ljunggren, Springfield, Vt., assignors to Bryant Chucking Grinder Company, Springfield, Vt., a corporation of Vermont Application April 26, 1949, Serial No. 89,758

4 Claims. (Cl. 308—189)

This invention relates to the mounting of rotors designed to operate at high rotational speeds such as of the order of 75,000 R. P. M. and higher. Such rotors, for example, may be those of high frequency electric motors and may carry small diameter grinding wheels. Grinding wheels require high peripheral velocities for best results, and due to the small diameters of the grinding wheels necessary for grinding small holes, high rotation speeds are necessary to produce the desired high peripheral velocity.

Such high speed rotors require simple bearings and such bearings must be so mounted as to accommodate themselves automatically to changing operating conditions and without undue tightness or looseness.

One object of the present invention, therefore, is to provide anti-friction bearing mountings which are preloaded to the desired degree so as to avoid undesirable play but which are arranged to be self-adjusting under changes, due, for example, to temperature variations.

Further objects and advantages will appear from a complete description of an embodiment of the invention shown in the accompanying drawings.

Figure 1:
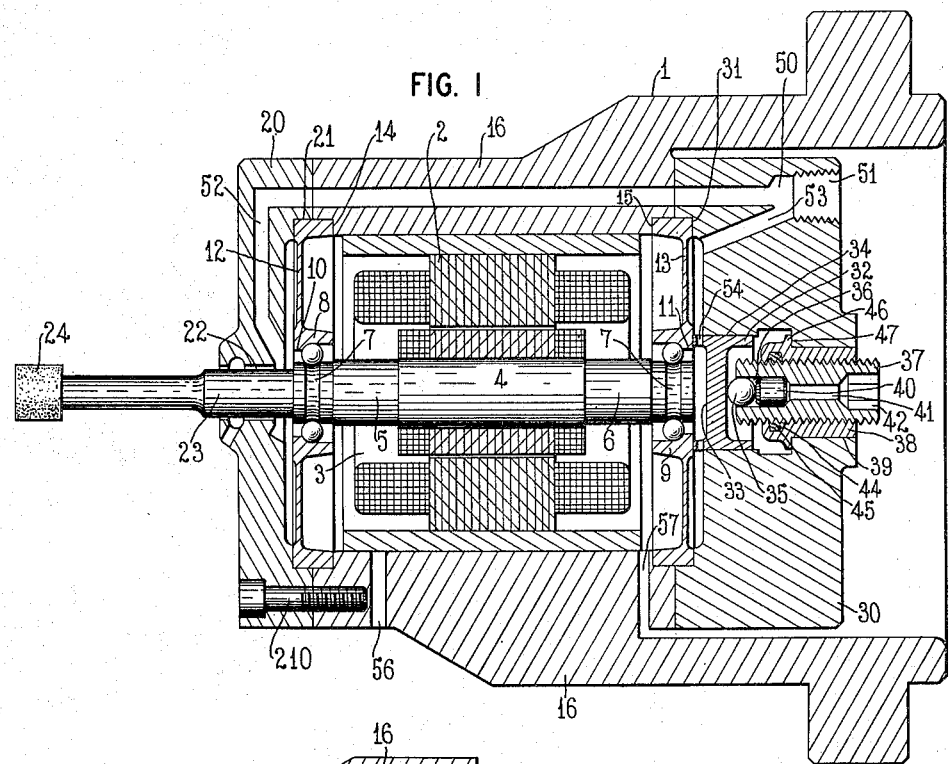
Figure 1 is a central longitudinal sectional view through a variable frequency motor embodying the invention.

Referring to the drawings, at 1 is shown a motor casing, to the interior of which may be secured suitable stator and windings therefor shown generally at 2, leaving a central opening 3 for the reception of the rotor 4. This rotor 4 has shaft extensions 5 and 6 at opposite ends in which are formed inner raceway grooves 7 of a pair of rolling bearings shown as single row ball bearings. The outer raceways 8 and 9 of these bearings are angle contact bearings having their smaller diameter end portions 10 and 11 positioned outwardly of their respective balls so they are oppositely disposed. These outer raceways are shown as carried at the inner ends of a pair of diaphragms 12 and 13, and as shown, these outer raceways are integral with these diaphragms. The outer margins of these diaphragms are mounted in fixed position, being seated in annular recesses 14 and 15, respectively, of the motor casing 16. The diaphragm 12 is secured in its recess 14 by means of a cap 20 having a diaphragm-receiving recess 21 and which is secured across one end of the motor as by screws 210 which pass through the cap 20 and into the motor casing 16. A central hole 22 through the cap 20 provides for the passage therethrough of the rotor shaft extension 23 which may carry on its outer end a grinding wheel 24 or any other desired device.

Figure 2:
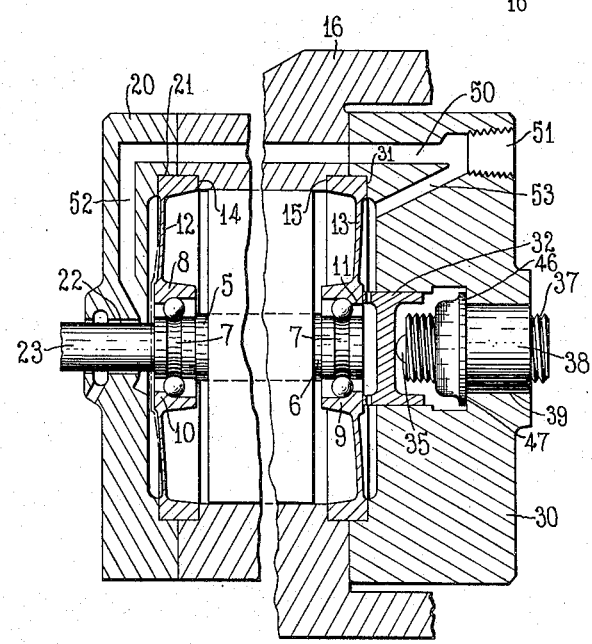
Figure 2 is a fragmentary view similar to a portion of Figure 1 but illustrating the method of loading the bearings and the construction which provides automatic compensation for temperature variations.

The diaphragm 13 is similarly held in position by a circular cap 30 which has a recess 31 engaging over the outer periphery of the diaphragm 13. The cap 30, however, is much thicker than the cap 20 and is provided substantially coaxial with the rotor 4 with a central bore 34 in which is slidably mounted a sleeve 32 having a transverse wall member 33. The inner end of the sleeve 32 bears against the outer face of the outer raceway member 9 and by applying suitable pressure thereagainst this raceway 9 is pressed to the left as shown in Figures 1 and 2, flexing the inner portion of the diaphragm 13 and applying loading pressure to both ball bearings through the engagement and axial thrust of its smaller diameter portion 11 on the right hand ball bearing and through this bearing transmitting axial pressure to the rotor, which, in turn, thrusts the left hand ball bearings against the portion 10 of the opposed bearing. Such loading pressure may be exerted as by a ball 35 carried in a bore 36 in a sleeve 37 which is threaded into a nut 38 seated in a bore 39 centrally disposed in the cap 30. This ball 35 bears against a hardened plug 40 seated in the bore 36 and which is accessible for removal, when the sleeve 37 is threaded out from the nut 39, through a central bore 41.

The outer end of the sleeve 37 may be provided with a polygonal socket 42 for the reception of a suitable tool by which rotation of the sleeve and a consequent axial motion thereof may be produced. The nut 38, as shown, is provided with an annular recess 44 within which may be placed a fiber or like washer 45 acting in the nature of a lock nut and taking up end play between the sleeve 37 and its nut 39. This nut 38 is shown as provided with a flange 46 which engages an annular shoulder 47 on the cap 30 which takes the thrust imparted to the ball 35 by the diaphragms 13 and 12.

The ball 35 and its mounting permits a slight rocking of the bearing 11, allowing for a slight lack of parallelism between the raceways and the face of the outer ring of the ball bearing as set forth in an application for United States Letters Patent to Willis F. Moore, Serial No. 23,911 filed April 29, 1948, now Patent Number 2,502,874 issued April 4, 1950, for Spindle Mounting for High Speeds.

The desired loading of the bearings is produced by adjusting the sleeve 37 to flex the diaphragms 12 and 13 to the desired extent, this action being shown somewhat exaggerated in Figure 2. The diaphragm 12 is permitted a further independent flexing motion, increasing as the rotor heats up during operation from a starting cold condition, the resiliency of the diaphragm 12 acting to automatically take up the loading on the bearings when the rotor cools.

Suitable means may be provided for introducing a lubricant to the ball bearings. As shown this comprises a passage 50 extending through the casing 16 and the cap 30 which is provided with a suitable threaded aperture 51 for the reception of a pipe fitting (not shown). This passage 50 communicates with a passage 52 in the end cap 20 which leads toward a central axis and breaks through the inner wall of the cap adjacent to the raceway 8. The passage 50 may be provided with a branch 53 passing through the cap 30 and which leads to the outer face of the diaphragm 13 and through perforations 54 through the outer wall of the sleeve 32 to the outer face of the right hand ball bearing. Lubricant in the form of a mist of air and oil may be introduced into the passage 50 and drainage from the ball bearings may escape through suitable vent passages 56 and 57.

From the foregoing description of an embodiment of this invention it will be evident to those skilled in the art that various changes and modifications might be made without departing from its spirit or scope.

We claim:

1. In combination, a rotor, a pair of spaced oppositely disposed angular contact ball bearings supporting said rotor, a pair of diaphragms each carrying the outer raceway of one of said bearings, means fixing the outer margins of said diaphragms, a sleeve mounted for motion parallel to the axis of said spindle and bearing against the outer raceway of one of said bearings, and means for adjusting said sleeve axially of said spindle to load said bearings.

2. In combination, a rotor, a pair of angular contact ball bearings supporting said rotor, a diaphragm carrying the outer raceway of one of said bearings, a sleeve mounted for linear motion substantially coaxially with said rotor and bearing on the outer raceway of the other of said bearings, said sleeve having a transverse wall, a ball bearing on said wall substantially coaxial with said rotor, and means for adjusting said ball axially of said motor to load said bearings to an adjustable extent against the flexing of said diaphragm.

3. In combination, a rotor, a pair of spaced oppositely disposed angular contact ball bearings supporting said rotor, a pair of diaphragms each carrying the outer raceway of one of said bearings, means fixing the outer margins of said diaphragms, a sleeve mounted for motion parallel to the axis of said spindle and bearing against the outer raceway of one of said bearings, means for adjusting said sleeve axially of said spindle to load said bearings, said sleeve having a transverse wall, and an element adjustable to engage said sleeve wall substantially in the central axis of said spindle and load said bearings.

4. In combination, a rotor, a pair of spaced oppositely disposed angular contact ball bearings supporting said rotor, a pair of diaphragms each carrying the outer raceway of one of said bearings, means fixing the outer margins of said diaphragms, a sleeve mounted for motion parallel to the axis of said spindle and bearing against the outer raceway of one of said bearings, and means for adjusting said sleeve axially of said spindle to load said bearings, the other of said diaphragms being free to flex in response to lengthwise expansion and contraction of said rotor due to temperature variations.

WILLIAM J. BRYANT.
THOR H. LJUNGGREN.

REFERENCES CITED

The following references are of record in the file of this patent:

UNITED STATES PATENTS

| Number | Name | Date |
| --- | --- | --- |
| 1,639,684 | Bott | Aug. 23, 1927 |

FOREIGN PATENTS

| Number | Country | Date |
| --- | --- | --- |
| 215,470 | Switzerland | June 30, 1941 |